United States Patent [19]
Lamping

[11] Patent Number: 6,123,365
[45] Date of Patent: Sep. 26, 2000

[54] STRUCTURE FOR PROTECTING A BULKHEAD FITTING

[75] Inventor: Frank G. Lamping, Bellevue, Ky.

[73] Assignee: Delaware Capital Formation, Inc., Wilmington, Del.

[21] Appl. No.: 09/245,230

[22] Filed: Feb. 5, 1999

Related U.S. Application Data

[62] Division of application No. 08/729,784, Oct. 8, 1996.

[51] Int. Cl.⁷ .................................................. F16L 11/12
[52] U.S. Cl. .......................... 285/45; 285/192; 285/139.2
[58] Field of Search .................................... 285/230, 236, 285/45, 192, 139.2, 204

[56] References Cited

U.S. PATENT DOCUMENTS

| | | |
|---|---|---|
| 0,548,706 | 10/1895 | Gundermann . |
| 0,621,108 | 3/1899 | Leonard . |
| 0,887,850 | 5/1908 | Rollins . |
| 1,978,958 | 12/1934 | Robinson . |
| 2,132,636 | 10/1938 | Maahs . |
| 2,277,885 | 3/1942 | Rodanet . |
| 2,320,636 | 6/1943 | Miller . |
| 2,348,490 | 4/1944 | Newman et al. . |
| 2,454,465 | 11/1948 | Leo et al. . |
| 2,779,609 | 1/1957 | Portney et al. .......................... 285/192 |
| 2,827,639 | 10/1958 | Schmidt . |
| 3,759,280 | 9/1973 | Swanson ................................. 285/236 |
| 3,958,313 | 5/1976 | Roseborough .......................... 285/230 |
| 3,973,789 | 8/1976 | Kunz et al. . |
| 4,086,736 | 5/1978 | Landrigan ............................... 285/192 |
| 4,203,190 | 5/1980 | Temple .................................... 285/230 |
| 4,411,458 | 10/1983 | Strunk et al. . |
| 4,478,437 | 10/1984 | Skinner ................................... 285/236 |
| 4,775,073 | 10/1988 | Webb . |
| 4,805,444 | 2/1989 | Webb . |
| 4,932,257 | 6/1990 | Webb . |
| 4,971,477 | 11/1990 | Webb et al. . |
| 5,040,408 | 8/1991 | Webb . |
| 5,060,509 | 10/1991 | Webb . |
| 5,096,206 | 3/1992 | Andre et al. ............................ 285/236 |
| 5,098,221 | 3/1992 | Osborne . |
| 5,129,684 | 7/1992 | Lawrence et al. ...................... 285/236 |
| 5,150,928 | 9/1992 | Lodder et al. . |
| 5,257,652 | 11/1993 | Lawrence . |
| 5,263,794 | 11/1993 | Webb . |
| 5,265,652 | 11/1993 | Brunella ............................... 285/139.1 |
| 5,295,760 | 3/1994 | Rowe ..................................... 285/192 |

(List continued on next page.)

FOREIGN PATENT DOCUMENTS

| | | | |
|---|---|---|---|
| 85934 | 10/1958 | Denmark ............................... 285/192 |
| 2494391 | 5/1982 | France ................................... 285/192 |
| 2675879 | 10/1992 | France ................................... 285/192 |
| 2940125 | 4/1981 | Germany ................................. 285/45 |
| 4014684 | 9/1990 | Germany . |
| 295897 | 11/1991 | Germany ............................... 285/192 |
| 4200866 | 7/1993 | Germany ............................... 285/192 |
| 424338 | 6/1948 | Italy ......................................... 285/45 |
| 85527 | 7/1978 | Japan ..................................... 285/192 |
| 85968 | 3/1936 | Sweden .................................... 285/45 |
| 0115310 | 12/1917 | United Kingdom . |
| 0505692 | 5/1939 | United Kingdom . |
| 0512256 | 8/1939 | United Kingdom . |
| WO9007074 | 6/1990 | WIPO . |
| WO9320372 | 10/1993 | WIPO . |

OTHER PUBLICATIONS

Promax, Inc., Promax Protection Product Guide/Price List, 1994, New Castle, Delaware.

Environ Products, Inc., Environ Products Price List, Pulication No. PL–1007, Jun. 1, 1994, Lionville, Pennsylvania.

Advanced Polymer Technology, Inc., Advanced Flexible Underground Piping System, 1995, Elkhart, Indiana.

(List continued on next page.)

*Primary Examiner*—Eric K. Nicholson
*Attorney, Agent, or Firm*—Dinsmore & Shohl LLP

[57] ABSTRACT

A shield positioned on the exterior of a sump to provide an access space for displacement of a portion of an entry fitting into the access space. The shield can allow for the removal of the entry fitting or an entry fitting seal without having to first remove backfill from the exterior of the sump.

18 Claims, 2 Drawing Sheets

U.S. PATENT DOCUMENTS

| | | |
|---|---|---|
| 5,297,896 | 3/1994 | Webb . |
| 5,333,490 | 8/1994 | Webb . |
| 5,345,813 | 9/1994 | Flessas . |
| 5,366,318 | 11/1994 | Brancher ................................ 285/236 |
| 5,372,454 | 12/1994 | Lawrence . |
| 5,398,976 | 3/1995 | Webb . |
| 5,407,300 | 4/1995 | Guindon et al. . |
| 5,431,457 | 7/1995 | Youngs . |
| 5,490,419 | 2/1996 | Webb . |
| 5,494,374 | 2/1996 | Youngs et al. . |
| 5,527,130 | 6/1996 | Webb . |
| 5,553,971 | 9/1996 | Osborne . |
| 5,567,083 | 10/1996 | Osborne . |
| 5,704,656 | 1/1998 | Rowe . |
| 5,826,919 | 10/1998 | Bravo et al. ............................ 285/236 |

OTHER PUBLICATIONS

Total Containment. . . Pioneering Secondary Containment Systems For Future Generations, PB100 Apr. 1995, Oaks, Pennsylvania.

Total Containment, "Delivering the Difference", 1996, Oaks, Pennsylvania.

Advanced Polymer Technology, Inc., Quick–Set™ Modular Tank Sump System, Publication No. TS201, Aug. 1, 1993.

Advanced Polymer Technology, Inc., Poly–Tech™ Flexible Entry Boots, Publication No. FEB201, Aug. 1, 1993, Elkhart, Indiana.

Advanced Polymer Technology, Inc., Poly–Tech™ Split Dispenser Systems, PDS201, Aug. 1, 1993, Elkhart, Indiana.

Environ, GeoFlex™ Piping System, Publication No. PM–0402, Feb. 1, 1994, Lionville, Pennsylvania.

Environ, Tank Sump Manual, Publication No. PM–0104, Jul. 1, 1994, Lionville, Pennsylvania.

Total Containment, Dispenser Sumps, Publication No. DS800, Sep. 1, 1994, Oaks, Pennsylvania.

Total Containment, U.S. Price Manual, Publication No. PM1500, Apr. 1, 1995, Oaks, Pennsylvania.

Environ, Dispenser Containment Manual, Pulication No. P–DCM–4030, May 15, 1995, Lionville, Pennsylvania.

Total Containment, Multisided Tank Sumps, Publication No. SR200, Jun. 1, 1995, Oaks, Pennsylvania.

Total Containment: Tank Sumps: Fiberglass/Cuffed Polyethylene, Publication No. SR300, Jun. 1, 1995, Oaks, Pennsylvania.

Advanced Polymer Technology, Inc., Poly–Tech™ TS–4230 Standard Burial Tank Sump, Publication No. TS42, Sep. 15, 1995, Elkhart, Indiana.

Environ, Installation Instructions Flexible Entry Boots, Publication No. P–FBI–5070, Mar. 1, 1995, Lionville, Pennsylvania.

Environ, Product Price List, Publication No. P–APB–1010, Aug. 15, 1996, Lionville, PA.

Environ, The GeoFlex System, Publication No. P–APB–2010, Oct. 1, 1996, Lionville, PA.

STRUCTURE FOR PROTECTING A BULKHEAD FITTING

CROSS REFERENCES TO RELATED APPLICATIONS

This is a division of application Ser. No. 08/729,784 filed Oct. 8, 1996.

TECHNICAL FIELD

This invention relates generally to the field of bulkhead or entry fittings used in underground sumps, and more particularly relates to a structure for providing an access space external to a wall of an underground container, and about a portion of a pipe passing through the wall and an end of an entry fitting disposed within an access opening on the wall.

BACKGROUND OF THE INVENTION

Entry fittings are used in underground sumps to seal the interface between an access opening of the sump and a pipe extending into the sump through the access opening. Entry fittings are designed to prevent the flow of a fluid, such as gasoline, which has leaked into the sump, from entering the surrounding ground, and for preventing the flow of ground water into the sump.

After an entry fitting has been initially installed, the seal eventually ages and takes a compression set. Slight movement of the pipe or thermal expansion and contraction can result in leakage about the seal. When this occurs, conventional entry fittings must be entirely replaced due to the lack of, or the relatively small range of, adjustable sealing force provided by such entry fittings.

There are several conventional entry fitting designs in use. One such entry fitting includes a rubber boot having a planar portion and a tubular portion, the tubular portion being conjoint with and perpendicular to the planar portion. The planar portion is positioned on the exterior of the sump wall and contains bolts which extend through a plurality of holes drilled in the sump and through a compression ring positioned on the interior of the sump wall. Nuts threadedly engage the bolts and pull the planar portion against the exterior of the sump wall.

The tubular portion extends into the sump through the access opening, and is sealingly clamped to the pipe. This type of entry fitting does not allow a range of adjustable sealing force between the planar portion and the sump wall, and requires considerable installation time due to the required drilling of holes, and tightening of the requisite nuts and bolts. Further, if the boot develops a leak, the entire entry fitting must be replaced, since there is not a separate seal separable from the entry fitting. Further, replacement of the entry fitting may necessitate removal of backfill from the exterior of the sump to permit withdrawal and replacement of the boot.

Therefore, it is apparent that the capability to replace an entry fitting or an entry fitting seal without requiring removal of backfill from the exterior of the sump would be desirable. Accordingly, a structure that would prevent backfill from surrounding the exterior of a sump in the area of the entry fitting and that would enable displacement of a portion of the entry fitting into the access space would also be desirable. Moreover, it would be desirable if the access space would allow sufficient displacement of the entry fitting into the access space to allow for the removal of the seal from the entry fitting.

SUMMARY OF THE INVENTION

It is one object of this invention to provide a shield which allows replacement of an entry fitting, or the entry fitting seal, without requiring removal of backfill from the exterior of the sump.

This and other objects of this invention are achieved with a shield having a first end and a second end which is positioned on the exterior of the sump wall. The shield defines an internal access space intermediate the first and second ends. The access space is disposed about an axial portion of the pipe and has a diametral dimension larger than the corresponding diametral dimension of the entry fitting. The access space has an axial dimension sufficient to allow displacement of a portion of the entry fitting into the access space. The first end of the shield circumscribes the access opening and is in proximity to the wall so as to inhibit the flow of backfill material into the access space between the shield and the wall. The second end of the shield circumscribes the pipe so as to inhibit the flow of backfill into the access space between the shield and the pipe. The shield is removably fixed with respect to the pipe so as to selectively prevent relative axial displacement between the pipe and the shield, and to secure the position of the shield relative to the wall.

Still other objects of the present invention will become apparent to those skilled in this art from the following description, wherein there is shown and described a preferred embodiment of this invention, simply by way of illustration, of one of the best modes contemplated for carrying out the invention. As will be realized, the invention is capable of different obvious aspects all without departing from the invention. Accordingly, the drawings and description will be regarded as illustrative in nature and not as restrictive.

BRIEF DESCRIPTION OF THE DRAWINGS

The accompanying drawings incorporated in and forming a part of the specification, illustrate several aspects of the present invention, and together with the description serve to explain the principals of the invention. In the drawings.

Reference will now be made in detail to the present preferred embodiment of the invention, an example of which is illustrated in the accompanying drawings, wherein like numerals indicate the same elements throughout the views.

DETAILED DESCRIPTION OF THE PREFERRED EMBODIMENTS

Figure 1:
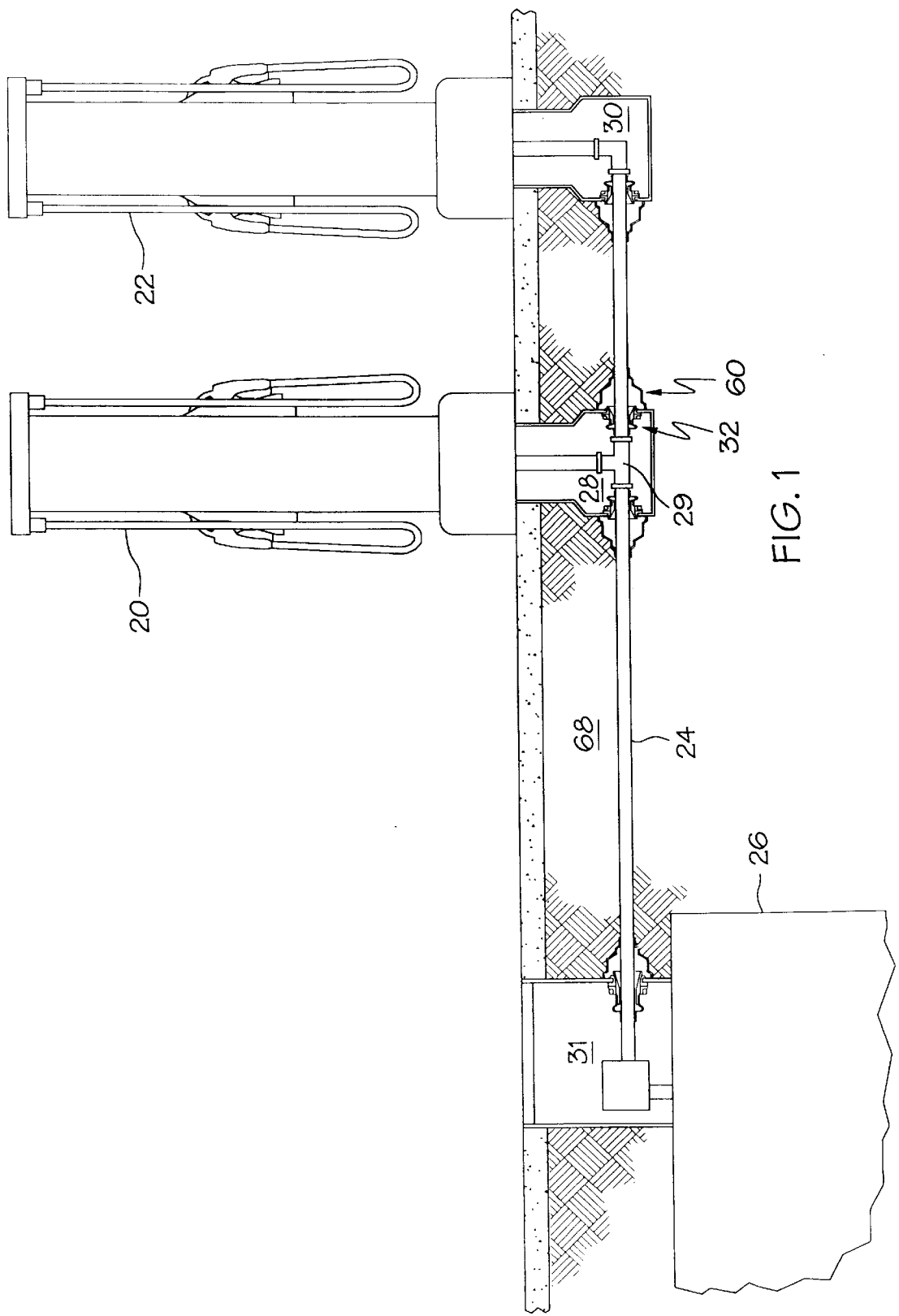
FIG. 1 is a schematic cross-sectional view of a fuel dispensing system showing an entry fitting according to one embodiment of this invention.

Referring now to the drawings, FIG. 1 shows a schematic view of a fuel dispensing system. Fuel dispensers 20 and 22 are in communication with fuel conduit 24 which in turn is in communication with underground fuel tank 26. Upon demand, fuel flows from underground fuel tank 26 through fuel conduit 24 to fuel dispensers 20 and 22. A sump, such as sumps 28 and 30, surround each location where it is necessary to provide fuel conduit 24 with a fitting. Sump 28 captures fuel which can leak from fitting 29 or fuel dispenser 20 and prevents such fuel from entering backfill 68.

An entry fitting 32 is positioned at each access opening in the wall of sump 28. Entry fitting 32 provides a seal between conduit 24 and sump 28. Shield 60 is positioned on the exterior of sump 28 and prevents backfill 68 from surrounding the exterior of sump 28 in the area of entry fitting 32. The access space provided by shield 60 enables axial movement of entry fitting 32 outside of sump 28, as described in more detail below, and replacement of a seal associated with entry fitting 32 without removal of backfill 68. A similar entry fitting 32 is provided in sump 30 and access 31 to seal respective access openings.

Figure 2:
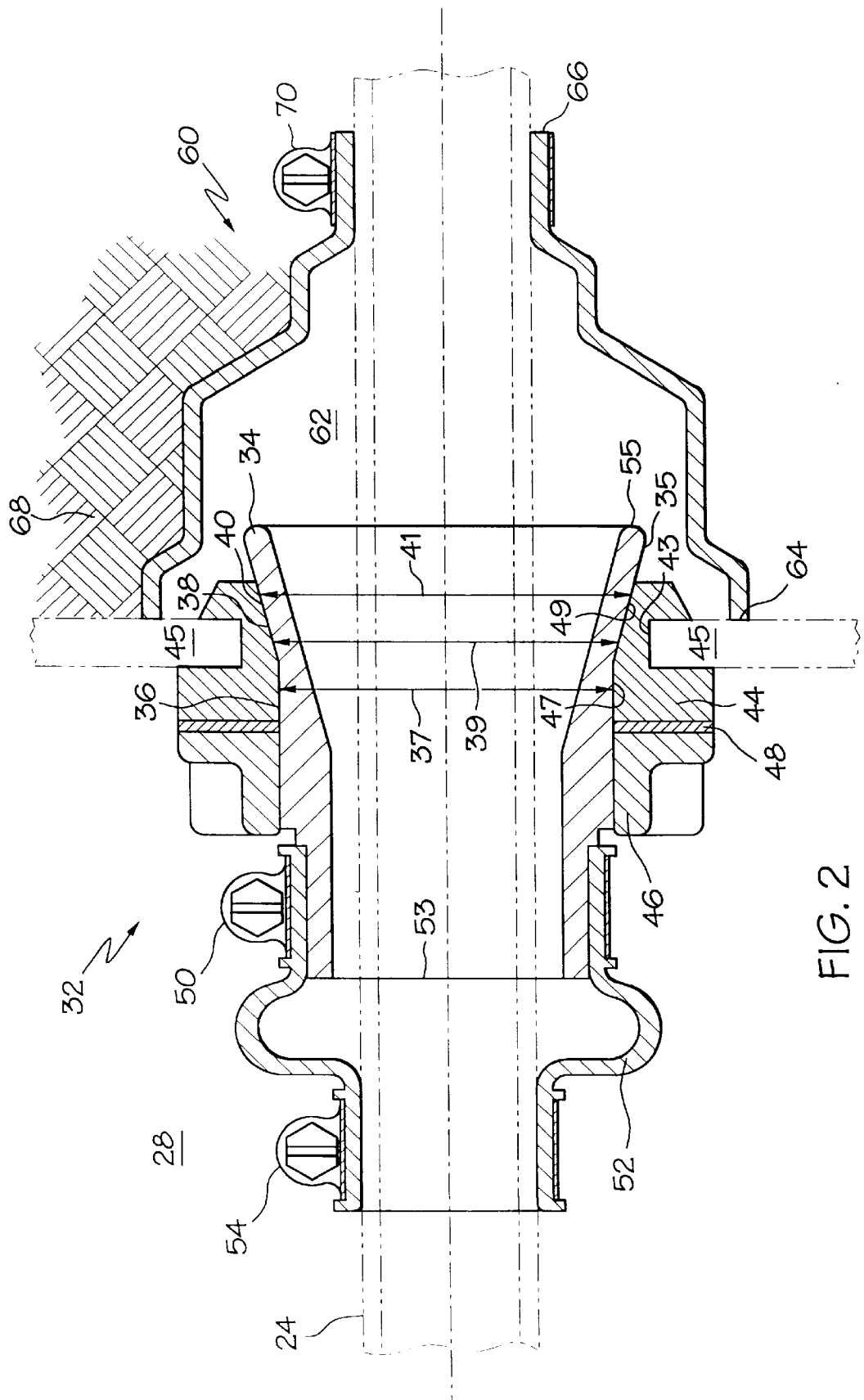
FIG. 2 is a cross-sectional view of an entry fitting and shield according to another embodiment of this invention.

FIG. 2 shows an entry fitting 32 according to one embodiment of this invention. Body 34 includes surface 35 having a first portion 36, second portion 40, and transition portion 38. First portion 36 has first radius 37 which is less than second radius 41 of second portion 40. Transition portion 38 extends between first portion 36 and second portion 40 and includes a transition radius 39 which is greater than first radius 37 and less than second radius 41. According to the embodiment of entry fitting 32 shown in FIG. 2, first portion 36 generally defines a cylindrical exterior surface, and transition portion 38 and second portion 40 generally define a conical portion which is conjoint with first portion 36.

Seal 44 is positioned circumferentially about body 34 and provides a sealing interface between body 34 and wall 45. Seal 44 prevents fluid from exiting sump 28 and entering backfill 68. Seal 44 can comprise an elastomer or any other composition known in the art suitable for its purposes. Body 34 is rigid, and can comprise a metal or thermoplastic, in a preferred embodiment body 34 comprises a thermoset material.

Entry fitting 32 also includes an axial displacement member such as nut 46 which can be threadedly engaged with an exterior threaded portion of body 34. Nut 46 can comprise the same materials as body 34. Nut 46 advances along surface 35 toward second portion 40 as it is rotated.

Advancement of nut 46 urges seal 44 against transition portion 38 which in turn urges seal 44 radially outward and against wall 45. As shown in FIG. 2, if the access opening formed by wall 45 were larger than that shown in FIG. 2, entry fitting 32 need only be slightly displaced toward the interior of sump 28 to sufficiently seal the opening in conjunction with seal 44. Thus, the entry fitting according to one embodiment of this invention allows a single entry fitting to seal a relatively wide range of access opening diameters. As nut 46 is advanced along surface 35, seal 44 is increasingly urged radially outward by transition portion 38, achieving a wide range of sealing force. Thus, should seal 44 begin to leak after installation, nut 46 need only be further axially advanced along surface 35 to reseal the access opening, potentially eliminating a need to replace seal 44.

The wide range of adjustable sealing force achieved by entry fitting 32 according to this embodiment enables the use of a single size entry fitting with a relatively wide range of access opening diameters. Entry fitting 32 can also accommodate irregularly shaped access openings. Installation is relatively fast because a single nut is used to adjust the sealing force between fuel conduit 24 and wall 45.

Washer 48 can be positioned between seal 44 and nut 46 to reduce friction. Washer 48 can comprise a high density polyethylene or any other relatively low friction material.

Seal 44 can include a first interior surface such as first portion 47 which conforms to the contour of first portion 36 of surface 35. Seal 44 can also include a second interior surface such as second portion 49 which conforms to the contour of transition portion 38 of surface 35. Seal 44 preferably, but not necessarily, includes annular groove 43 for closely receiving an edge of wall 45 and surrounding the edge of wall 45 for increasing the seal contact area between seal 44 and wall 45.

Clamp 50 sealingly urges one end of boot 52 against the periphery of end 53 of body 34, and boot 54 sealingly urges the other end of boot 52 against fuel conduit 24 to prevent fuel from entering the space between fuel conduit 24 and the interior surface of body 34.

Entry fitting 32 is installed in sump 28 by inserting transition portion 38 and seal 44 in the access opening formed by wall 45 and advancing nut 46 along surface 35 until sufficient sealing force between surface 35 and wall 45 is achieved. If, over time, seal 44 develops a leak, nut 46 need only be additionally rotated and advanced toward second portion 40 to increase the sealing force and reseal the access opening. If seal 44 has completely failed and requires replacement, fuel conduit 24 is disconnected from its fitting in sump 28, nut 46 is rotated in a reverse direction toward the interior of sump 28 to relieve pressure on seal 44, and is slid along with washer 48 over clamp 50, boot 52 and down the length of fuel conduit 24 and removed.

Body 34 can be urged toward the exterior of sump 28 in a direction toward backfill 68 to relieve the radial force on seal 44. After body 34 is extended sufficiently into access space 62, seal 44 can similarly be slid over clamp 50, boot 52 and down the length of fuel conduit 24 and removed. A new seal 44 is then placed over fuel conduit 24 and slid back onto body 34, followed by washer 48 and nut 46. Thus, even a complete failure of seal 44 can be fixed by replacement of a relatively inexpensive seal, rather than a new entry fitting 32. Further, replacement of seal 44 is a relatively quick process.

FIG. 2 shows shield 60 according to one embodiment of this invention. Shield 60 includes first end 64 and second end 66 spaced from first end 64. Shield 60 defines access space 62 which is intermediate first end 64 and second end 66, and which is disposed about an axial length of fuel conduit 24. Access space 62 has a diametral dimension larger than the corresponding diametral dimension of end 55 of body 34. Access space 62 also has an axial dimension sufficient to allow displacement of end 55 axially into access space 62 of shield 60. Shield 60 can comprise any suitable rigid material.

First end 64 circumscribes the access opening formed by wall 45 and is in sufficient proximity to wall 45 to prevent backfill 68 from entering access space 62. The distance between end 64 and wall 45 can vary depending upon the diameter of backfill 68. It is preferred that the distance between end 64 and wall 45 be less than the diameter of backfill 68 to prevent backfill 68 from entering access space 62.

Second end 66 circumscribes fuel conduit 24 to inhibit backfill 68 from entering access space 62 between fuel conduit 24 and shield 60. Shield 60 is removably fixed with respect to fuel conduit 24 to selectively prevent relative axial displacement between fuel conduit 24 and shield 60, and to secure the position of first end 64 with respect to wall 45. Clamp 70 radially urges first end 66 against fuel conduit 24 to prevent relative axial displacement between shield 60 and fuel conduit 24. Access space 62 should have a sufficient axial dimension to allow sufficient displacement of end 55 of body 34 into access space 62 to allow removal of seal 44 from body 34.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

What is claimed is:

1. In combination with an at least partially underground container having a wall with an access opening, and an entry fitting disposed within the access opening for sealing the access opening and receiving a pipe passing through the wall, a structure for providing an access space external to the wall about a portion of the pipe and an end of the entry fitting, comprising:

a) a shield, the shield having a first end and a second end spaced from the first end, the shield defining an internal access space intermediate the first and second ends, the access space being disposed about an axial portion of the pipe, and having a diametral dimension larger than a corresponding diametral dimension of the entry fitting and an axial dimension sufficient to allow displacement of a portion of the entry fitting into the access space;

b) the first end of the shield circumscribing the access opening, and being in proximity to the wall so as to inhibit the flow of backfill material between the shield and the wall, and into the access space, the second end of the shield circumscribing the pipe so as to inhibit the flow of backfill between the shield and the pipe, and into the access space; and c) the shield being removably fixed with respect to the pipe so as to selectively prevent relative axial displacement between the pipe and the shield, and to secure the position of the shield relative to the wall.

2. The structure according to claim 1, further comprising a clamp circumferentially positioned about the second end of the shield for removably fixing the shield with respect to the pipe.

3. The structure according to claim 1, wherein an interior surface of the shield defining the access space has a plurality of steps extending from the first end to the second end, the cross-sectional area of the space defined by each successive step decreasing in a direction toward the second end.

4. In combination with an at least partially underground container having a wall with an access opening, and an entry fitting disposed within the access opening for sealing the access opening and receiving a pipe passing through the wall, a structure for protecting the entry fitting comprising a shield, the shield having a first end disposed about the entry fitting in proximity to the wall and a second end of the shield being disposed about the pipe in spaced relationship to the first end, and the shield being operative to at least partially shield the entry fitting from backfill surrounding the underground container.

5. The structure according to claim 1, wherein the first end of the shield is spaced from the entry fitting.

6. The structure according to claim 1, wherein the shield is positioned completely external to the wall.

7. The structure according to claim 4, wherein the first end of the shield is spaced from the entry fitting.

8. The structure according to claim 4, wherein the shield is positioned completely external to the wall.

9. The structure according to claim 4, wherein the shield is removably fixed with respect to the pipe.

10. The structure according to claim 9, further comprising a clamp circumferentially positioned about the second end of the shield for removably fixing the shield with respect to the pipe.

11. The structure according to claim 4, wherein the shield defines an access space intermediate the first and second ends, the access space being disposed about an axial portion of the pipe, and having a diametral dimension larger than the corresponding diametral dimension of the entry fitting and an axial dimension sufficient to allow displacement of a portion of the entry fitting into the access space.

12. The structure according to claim 11, wherein an interior surface of the shield defines the access space, and wherein the interior surface has a plurality of steps extending from the first end to the second end, the cross-sectional area of the access space defined by each successive step decreasing in a direction toward the second end.

13. The structure according to claim 4, wherein the first end of the shield circumscribes the access opening so as to inhibit the backfill from flowing between the shield and the wall, and wherein the second end of the shield circumscribes the pipe so as to inhibit the backfill from flowing between the shield and the pipe.

14. A piping system comprising:

a) an at least partially underground container capable of being surrounded by backfill having a wall with an access opening;

b) a pipe passing through the access opening;

c) an entry fitting disposed within the access opening for sealing the access opening and receiving the pipe; and d) a structure configured to provide an access space external to the wall about a portion of the pipe and an end of the entry fitting, the structure comprising a shield having a first end and a second end spaced from the first end, the shield defining the access space intermediate the first and second ends, the access space being disposed about an axial portion of the pipe and having a diametral dimension larger than a corresponding diametral dimension of the entry fitting and an axial dimension sufficient to allow displacement of a portion of the entry fitting into the access space, wherein the first end of the shield circumscribes the access opening so as to inhibit backfill from falling between the shield and the wall, and wherein the second end of the shield circumscribes the pipe so as to inhibit backfill from flowing between the shield and the pipe.

15. The structure according to claim 14, wherein the first end of the shield is spaced from the entry fitting.

16. The structure according to claim 14, wherein the shield is positioned completely external to the wall.

17. The structure according to claim 14, wherein the shield is removably fixed with respect to the pipe.

18. The structure according to claim 17, further comprising a clamp circumferentially positioned about the second end of the shield for removably fixing the shield with respect to the pipe.

* * * * *